H. E. TAFT.
LOCK NUT.
APPLICATION FILED APR. 12, 1910.
1,019,379.
Patented Mar. 5, 1912.
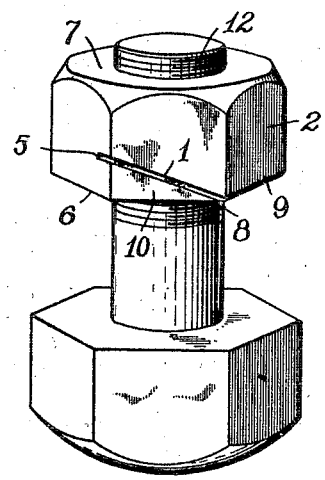
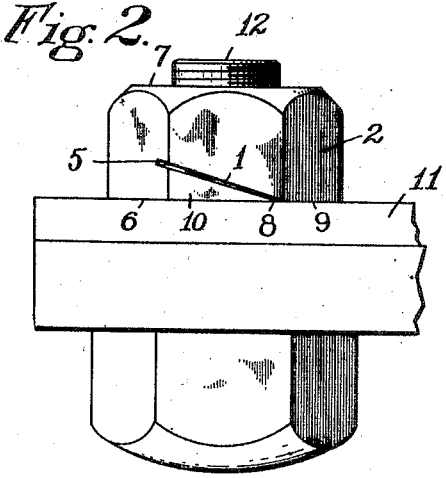
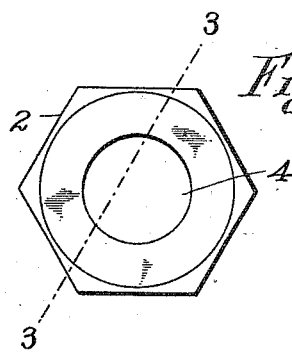
Witnesses
Roy D. Tolman
Penelope Comberbach.
Inventor
Hiram E. Taft.
By Rufus B. Fowler
Attorney

UNITED STATES PATENT OFFICE.

HIRAM E. TAFT, OF NORTHBRIDGE, MASSACHUSETTS, ASSIGNOR OF ONE-HALF TO EDWARD V. GRANGER, OF BURRILLVILLE, RHODE ISLAND.

LOCK-NUT.

1,019,379.  Specification of Letters Patent.  Patented Mar. 5, 1912.

Application filed April 12, 1910. Serial No. 554,981.

*To all whom it may concern:*

Be it known that I, HIRAM E. TAFT, of Northbridge, in the county of Worcester and Commonwealth of Massachusetts, have invented a new and useful Improvement in Lock-Nuts, of which the following is a specification, accompanied by drawings forming a part of the same.

The object of my invention is to provide a simple and efficient means for causing a nut to be held upon a screw threaded bolt against accidental displacement without the employment of any extra or accessory piece, and it consists in forming a narrow slit in the body of the nut in a plane at an oblique angle to the axis of the nut, and in such a position that a double strain is secured when the nut is screwed firmly into position, one strain being exerted upon that portion of the body of the nut which lies below the slit, and the other strain upon that portion of the body of the nut lying above the slit, as hereinafter described, the novel features being pointed out in the annexed claims.

Referring to the accompanying drawings, Figure 1 is a perspective view of a bolt having one of my improved lock nuts applied thereto. Fig. 2 is a side elevation of a bolt and nut, and representing two pieces clamped between the head of the bolt and the nut, and Fig. 3 is a plan view of the nut detached from the bolt.

Similar reference characters refer to similar parts in the different views.

In carrying out my invention I form a slit 1 in the body of the nut and lying in a plane at an oblique angle to the axis of the nut 2. The slit extends from one side slightly past the center of the nut, the bottom of the slit being indicated by the broken line 3—3, Fig. 3, and preferably extending about two thirds of the way through the screw threaded opening 4, which receives the bolt. The inner edge 5 or bottom of the slit is located nearer the pressing face 6 of the nut than it is from the top or crown 7 of the nut. I preferably make the distance between the pressing face 6 and the end 5 of the slit about one half the distance between the end of the slit and the crown 7 of the nut.

The lower and outer end 8 of the slit 1 terminates at the edge of the nut, said slit forming with the outer side of the nut an acute angled corner 9 which overhangs the end 8 of the slit, with the inner edge of the slit nearer the face 6 than the crown 7. By this location of the slit 1 a slender triangular tongue 10 is formed on the under side of the nut. As the nut is screwed into bearing position a compression of the tongue 10 takes place, partially closing the slit and bringing a pressure to bear against the corner 9. As pressure upon the nut is increased a second strain is imparted to the nut by the contact of the corner 9 with the work 11, said strain being received by the body of the nut above the slit 1. The first strain noted above results in a yielding of the tongue 10, and the second strain results in a yielding of the body of the nut between the crown 7 and the inner end 5 of slit 1. The two strains imparted consecutively to the nut, namely, the strain upon the tongue 10 and the strain upon the body of the nut above the slit 1 are both produced by the pressure applied directly to the pressing face 6 of the nut against the work 11, or other object to which the nut is applied, and both strains are due to the direct pressure applied to the nut in a line parallel with its axis and caused by the rotation of the nut upon the screw threaded bolt 12.

I do not claim broadly the forming of a slit, oblique or otherwise, in the body of a nut, for the sake of weakening the same, and allowing a strain brought upon the nut to tend to deform the nut and produce a pressure upon the screw threads by which the bolt is held in position against accidental displacement.

By my improvement I form the oblique slit 1 in such a position that the resistance to a deforming strain exerted by the tongue will be less than that exerted by the body of the nut above the slit, and the outer end of the slit 1 is so located with reference to the edge of the nut as to form a corner 9 above the plane of the pressing face 6 and overlapping the end of the tongue 10, whereby the first strain upon the nut is received by the tongue and, as the tongue yields the strain is applied to the body of the nut through the contact of the corner 9 with the work or surface to which the nut is applied.

My improved lock nut is particularly adapted for use in places wherever a slight lost motion occurs either between the bolt and the work to be clamped or between the nut and the screw threaded end of the bolt as in all such cases a slight tipping movement of the nut is permitted, but I have found in practice that the deforming action of a pressure against the bearing face 6 occurs when such lost motion is extremely slight.

I claim,

1. As an article of manufacture, a lock nut having a slit formed in the body of the nut in a plane oblique to the axis of the nut and extending beyond the axis, with the outer edge of the slit terminating at the angle between the pressing surface of the nut and one of its sides.

2. As an article of manufacture, a lock nut having a slit formed in the body of the nut in a plane oblique to the axis of the nut, with the inner edge of said slit extending partially through the screw threaded opening of the nut and nearer the pressing surface of the nut than the crown, and with the outer edge of said slit terminating at the angle between the pressing surface of the nut and one of its vertical sides, forming a bearing corner overhanging the outer edge of said slit.

3. A lock nut having an oblique slit in the body of the nut, said slit extending upward from the angle between the pressing surface of the nut and one of its vertical sides partially through the screw threaded central opening of the nut, with said pressing surface forming a triangular tongue and also forming a bearing corner at the lower edge of said vertical side, with said bearing corner slightly above said pressing surface.

Dated this 8th day of April 1910.

HIRAM E. TAFT.

Witnesses:
JAMES W. DALY,
GEORGE W. GREENE.